(12) United States Patent
Xiao et al.

(10) Patent No.: US 8,755,465 B2
(45) Date of Patent: Jun. 17, 2014

(54) APPARATUS AND METHOD FOR PROCESSING SIGNAL IN WIRELESS COMMUNICATION SYSTEM

(75) Inventors: Yue Xiao, Sichuan (CN); Qian Tang, Sichuan (CN); Jun Fang, Shanxi (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/990,429

(22) PCT Filed: May 31, 2012

(86) PCT No.: PCT/CN2012/076333
§ 371 (c)(1),
(2), (4) Date: May 30, 2013

(87) PCT Pub. No.: WO2013/177776
PCT Pub. Date: Dec. 5, 2013

(65) Prior Publication Data
US 2013/0336429 A1    Dec. 19, 2013

(51) Int. Cl.
*H04L 27/00*    (2006.01)
(52) U.S. Cl.
USPC .......................................................... 375/316
(58) Field of Classification Search
CPC .................................................... H04B 7/0413
USPC ......................................................... 375/316
See application file for complete search history.

(56) References Cited

U.S. PATENT DOCUMENTS

| | | | |
|---|---|---|---|
| 2008/0056402 A1 | 3/2008 | Jang et al. | |
| 2009/0116590 A1 | 5/2009 | Lee et al. | |
| 2010/0246539 A1* | 9/2010 | Guillouard et al. | 370/336 |
| 2010/0329378 A1 | 12/2010 | Leung | |
| 2012/0051282 A1 | 3/2012 | Kruglick | |
| 2012/0134433 A1* | 5/2012 | Haas et al. | 375/262 |

FOREIGN PATENT DOCUMENTS

| | | |
|---|---|---|
| CN | 1859343 A | 11/2006 |
| CN | 101998440 A | 3/2011 |

OTHER PUBLICATIONS

Renzo, "Spatial Modulation for Multiple-Antenna Wireless Systems: A Survey," IEEE Communications Magazine, Dec. 2011.*
Mesleh, "Spatial Modulation—A New Low Complexity Spectral Efficiency Enhancing Technique," First International Conference on Communications and Networking in China, 2006. China Com '06, Publication Year: 2006 , pp. 1-5.*

(Continued)

*Primary Examiner* — Juan A Torres
(74) *Attorney, Agent, or Firm* — Ren-Sheng International (57) ABSTRACT

Methods for processing a signal received at a receiver in a wireless communication system in a time slot are presented. Some example methods include obtaining an estimated transmit signal for a transmit antenna of the wireless communication system. The estimated transmit signal may be illustrated on a constellation diagram in accordance with a modulation scheme of the wireless communication system. Example methods further include calculating a distance between the estimated transmit signal and a corresponding constellation point on the constellation diagram. The corresponding constellation point is the closest constellation point for the estimated transmit signal among all constellation points in accordance with the modulation scheme of the wireless communication system. Example methods further include determining whether the transmit antenna is likely to transmit the signal received at the receiver based on the distance.

20 Claims, 4 Drawing Sheets

(56) References Cited

OTHER PUBLICATIONS

Jan Mietzner et al., "Multiple-Antenna Techniques for Wireless Communications—A Comprehensive Literature Survey", IEEE Communications Surveys & Tutorials, Second Quarter, 2009, pp. 87-104, vol. 11, No. 2.

P. W. Wolniansky et al., "V-Blast: An Architecture for Realizing Very High Data Rates Over the Rich-Scattering Wireless Channel", International Symposium on Signals, Systems, and Electronics (ISSSE), IEEE, Sep. 29-Oct. 2, 1998, pp. 295-300.

Vahid Tarokh et al., "Space-Time Block Codes from Orthogonal Designs", IEEE Transactions on Information Theory, Jul. 1999, pp. 1456-1467, vol. 45, No. 5.

Raed Y. Mesleh et al., "Spatial Modulation", IEEE Transactions on Vehicular Technology, Jul. 2008, pp. 2228-2241, vol. 57, No. 4.

Ping Yang et al., "Initial Performance Evaluation of Spatial Modulation OFDM in LTE-based Systems", In proceedings of 6th International ICST Conference on Communications and Networking in China (CHINACOM), IEEE, 2011, pp. 102-107.

Jeyadeepan Jeganathan et al., "Spatial Modulation: Optimal Detection and Performance Analysis", IEEE Communications Letters, Aug. 2008, pp. 545-547, vol. 12, No. 8.

Abdelhamid Younis et al., "Reduced Complexity Sphere Decoder for Spatial Modulation Detection Receivers", IEEE Globecom, 2010, pp. 1-5.

Notification of Transmittal of the International Search Report and the Written Opinion of the International Searching Authority, PCT/CN2012/076333, Mar. 7, 2013.

\* cited by examiner

300 A computer program product

304 A signal bearing medium 302 at least one of one or more instructions for obtaining an estimated transmit signal for a transmit antenna of the MIMO system, wherein the estimated transmit signal is illustrated on a constellation diagram in accordance with a modulation scheme of the MIMO system;

one or more instructions for calculating a distance between the estimated transmit signal and a corresponding constellation point on the constellation diagram, wherein the corresponding constellation point is the closest constellation point for the estimated transmit signal among all constellation points in accordance with the modulation scheme of the MIMO system; and/or one or more instructions for determining whether the transmit antenna is likely to transmit the signal received at the receiver based on the distance 306 a communication medium 308 a non-transitory computer readable medium 310 a recordable medium

FIG. 4

APPARATUS AND METHOD FOR PROCESSING SIGNAL IN WIRELESS COMMUNICATION SYSTEM

CROSS-REFERENCE TO RELATED APPLICATIONS

The present application is a 371 application of International Application PCT/CN2012/076333, filed on May 31, 2012 and entitled "APPARATUS AND METHOD FOR PROCESSING SIGNAL IN WIRELESS COMMUNICATION SYSTEM." The International Application, including any appendices or attachments thereof, is incorporated by reference herein in its entirety.

BACKGROUND OF THE DISCLOSURE

Description of the Related Art

Spatial modulation refers to a transmission technique in multiple input and multiple output (MIMO) systems. In a spatial modulation scheme, only one transmit antenna is active at a specified time slot while the other transmit antennas in the MIMO system are inactive in the same specified time slot. Also, some approaches to process the signals received at the receiver of the MIMO system have been proposed. Example processing approaches may include maximum ratio combination, maximize likelihood, and sphere decoder.

SUMMARY

Embodiment of the disclosure set forth methods for processing a signal received at a receiver in a wireless communication system in a time slot. Some example methods include obtaining an estimated transmit signal for a transmit antenna of the wireless communication system. The estimated transmit signal may be illustrated on a constellation diagram in accordance with a modulation scheme of the wireless communication system. Example methods further include calculating a distance between the estimated transmit signal and a corresponding constellation point on the constellation diagram. The corresponding constellation point is the closest constellation point for the estimated transmit signal among all constellation points in accordance with the modulation scheme of the wireless communication system. Example methods further include determining whether the transmit antenna is likely to transmit the signal received at the receiver based on the distance.

Other embodiments may generally relate to non-transitory computer-readable medium containing instructions for processing a signal received at a receiver in a wireless communication system in a time slot. One example non-transitory computer-readable medium may contain instructions, which when executed by a computing device, causes the computing device to obtain an estimated transmit signal for a transmit antenna of the wireless communication system, calculate a distance between the estimated transmit signal and a corresponding constellation point on a constellation diagram in accordance with a modulation scheme of the wireless communication system and determine whether the transmit antenna is likely to transmit the signal received at the receiver based on the distance. The estimated transmit signal may be illustrated on the constellation diagram. The corresponding constellation point may be the closest constellation point for the estimated transmit signal among all constellation points in accordance with the modulation scheme of the wireless communication system.

Additional embodiments may generally relate to computing devices configured to process a signal received at a receiver in a wireless communication system in a time slot. One example computing device may contain a processing unit. The processing unit is configured to obtain an estimated transmit signal for a transmit antenna of the wireless communication system, calculate a distance between the estimated transmit signal and a corresponding constellation point on a constellation diagram in accordance with a modulation scheme of the wireless communication system and determine whether the transmit antenna is likely to transmit the signal received at the receiver based on the distance. The estimated transmit signal may be illustrated on the constellation diagram. The corresponding constellation point may be the closest constellation point for the estimated transmit signal among all constellation points in accordance with the modulation scheme of the wireless communication system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs, and systems related to processing received signal at a receiver in a wireless communication system.

In this disclosure, a "constellation diagram" is a representation of a signal modulated by a modulation scheme (e.g., quadrature amplitude modulation or phase-shift keying). The constellation diagram displays the signal as a two-dimensional scatter diagram in the complex plane at symbol sampling instants. A "constellation point" is a point illustrated on the constellation diagram in accordance with the modulation scheme. For example, if the modulation scheme is binary phase shift keying modulation scheme, the constellation point may be [−1+0i] or [1+0i]. If the modulation scheme is quadrature phase shift keying modulation scheme, the constellation point may be [−0.7071−0.7071i], [−0.7071+0.7071i], [0.7071−0.7071i] or [0.7071+0.7071i].

In this disclosure, a wireless communication system may be a multiple input and multiple output (MIMO) system. A MIMO system includes a transmitter with multiple transmit antennas and a receiver with multiple receive antennas. In some embodiments, the MIMO system is spatially modulated. The spatial modulation scheme may be applied to any MIMO system with any number of transmit antennas and receive antennas. For example, the spatial modulation scheme may be applied to a MIMO system having N transmit antennas and M receive antennas in which N is greater than M.

The MIMO system set forth above may have a channel matrix of $H \in \mathbb{C}^{M \times N}$. In some embodiments, when the elements of the channel matrix H are complex Gaussian random variables with zero mean and unit variance, the receive vector (i.e., signal received at the receiver of the MIMO system) y is then given by:

$$y = Hx + n \qquad (1)$$

where x denotes the transmit vector (i.e., signal transmitted by the transmitter) of the MIMO system and n is the additive white Gaussian noise (AWGN) vector with variance $\sigma^2$. In the spatially modulated MIMO system, x is the transmitted signal from a specific transmit antenna.

Through the matrix operation, Hx+n is illustrated as:

$$Hx + n = h_i x_i + n \qquad (2)$$

in which $h_i$ denotes the i-th column of H, $x_i$ denotes the i-th row of x and i is an integer from 1 to N.

An estimated transmit vector r, which corresponds to the transmit vector x, may be obtained by multiplying the pseudo inverse of H with y. The estimated transmit vector r consists of elements of $r_i$, where i may be from 1 to N. Also, $r_i$ may be illustrated as:

$$r_i = g_i y \qquad (3)$$

where $g_i$ represents the pseudo inverse of $h_i$. In some embodiments, $r_i$ may be illustrated as a complex symbol on the constellation diagram of the MIMO system.

For any of $r_i$, a corresponding constellation point $r_i'$ may be identified among all constellation points on the constellation diagram in accordance with the modulation scheme of the MIMO system. In some embodiments, the constellation point $r_i'$ is the closest constellation point among all constellation points for $r_i$. With the identified constellation point, the distance $d_i$ between $r_i'$ and $r_i$ on the constellation diagram of the MIMO system may be calculated.

After obtaining $d_i$ for all transmit antennas of the MIMO system, an antenna index U is defined based on $d_i$ (1=1 to N), which is given by:

$$U = [u_1, u_2, \ldots, u_N] \qquad (4)$$

where $u_1$ is the specific transmit antenna of the MIMO system corresponding to the $d_i$ having the minimum magnitude, and $u_N$ is the specific transmit antenna of the MIMO system corresponding to the $d_i$ having the maximum magnitude.

In some embodiments, p elements of U are selected from $u_1$ to $u_p$, where 1 top are continuous. The number of p may be configurable. Among $u_1$ to $u_p$, the transmit antenna u' which most likely transmitted the signal may be give by:

$$u' = \underset{\widehat{r}_i \in \widehat{r}, i \in [u_1, \ldots, u_p]}{\operatorname{argmin}} \left\| y - h_i \widehat{r}_i \right\|^2 \qquad (5)$$

Therefore, the symbol s transmitted by the transmit antenna u' may be given by:

$$s = r_{u'}' \qquad (6)$$

In one illustrating example MIMO system, where N=4, M=2, p=2 and with binary phase shift keying (BPSK) modulation scheme, input bits of a transmitted signal through a transmit antenna may consist of three bits. The first two bits are used to identify the transmit antenna and the third bit is the data bit of the signal. For example, a signal having three input bits of 000 indicates the signal is transmitted by the first antenna (i.e., the first two bits of 00) of the MIMO system and carries a data bit of 0 (i.e., the third bit of 0). The data bit may be modulated in accordance with the BPSK modulation scheme of the MIMO system. Accordingly, input bits of 1 and 0 are modulated to symbols of [1+0i] and [−1+0i] on the constellation diagram of the MIMO system, respectively. Table 1 describes relations among input bits, transmit antenna index, data bit and transmitted symbol.

TABLE 1

| input bits | transmit antenna index | data bit | symbol |
|---|---|---|---|
| 000 | 1 | 0 | [−1+0i] |
| 001 | 1 | 1 | [1+0i] |
| 010 | 2 | 0 | [−1+0i] |
| 011 | 2 | 1 | [1+0i] |
| 100 | 3 | 0 | [−1+0i] |
| 101 | 3 | 1 | [1+0i] |
| 110 | 4 | 0 | [−1+0i] |
| 111 | 4 | 1 | [1+0i] | in which the first two bits of 00, 01, 10 and 11 indicate the signals are transmitted by the first, second, third and fourth antennas of the MIMO system, respectively.

Assuming the input bits of the transmitted signal are "100," the transmit vector x is $[0 \; 0 \; -1 \; 0]^T$. With the channel matrix and noise vector below, $$H = \begin{bmatrix} -0.3059 + 0.2314i & 0.0886 - 0.1320i & -0.8107 - 0.4160i & 0.8409 - 0.0964i \\ -1.1777 + 0.1235i & 0.2034 + 0.5132i & 0.8421 + 1.5437i & -0.0266 + 0.0806i \end{bmatrix}$$

$$n = [\; -0.0049 + 0.0089i \quad 0.00611 - 0.0113i \;]^T$$

the receive vector $y=Hx+n=[0.8058+0.4249i \ -0.8360-1.5550i]^T$.

Figure 1:
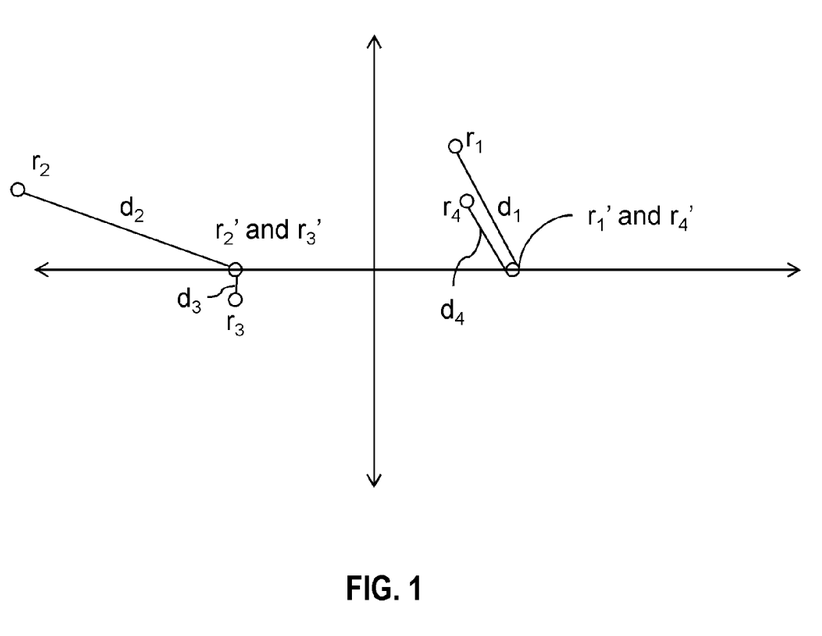
FIG. 1 is a constellation diagram illustrating constellation points $r_i'$ and estimated transmit vector elements $r_{i,}$.

Then, $r_i$, $r_i'$ and where i is from 1 to 4, are calculated below and illustrated in FIG. 1:

$$r_1 = [-0.1974 - 0.1491i \ -0.7601 - 0.0797i]$$
$$[0.8058 + 0.4249i \ -0.8360 - 1.5550i]^T$$
$$= [0.4159 + 1.0444i];$$

$$r_1' = [1 + 0i];$$

$$d_1 = 1.1963;$$

$$r_2 = [0.2685 + 0.4000i \ 0.6163 - 1.5551i]$$
$$[0.8058 + 0.4249i \ -0.8360 - 1.5550i]^T$$
$$= [-2.8869 + 0.7781i];$$

$$r_2' = [-1 + 0i];$$

$$d_2 = 2.0411;$$

$$r_3 = [-0.2067 + 0.10611i \ 0.2147 - 0.3936i]$$
$$[0.8058 + 0.4249i \ -0.8360 - 1.5550i]^T$$
$$= [-1.0031 - 0.0072i];$$

$$r_3' = [-1 + 0i];$$

$$d_3 = 0.0078;$$

$$r_4 = [1.1621 + 0.1332i \ -0.0368 - 0.1114i]$$
$$[0.8058 + 0.4249i \ -0.8360 - 1.5550i]^T$$
$$= [0.7374 + 0.7514i];$$

$$r_4' = [1 + 0i]; \text{ and}$$

$$d_4 = 0.7960.$$

therefore, U=[3, 4, 1, 2]. Because p=2, the third antenna (i.e., $u_1$) and the fourth antenna (i.e., $u_2$) are selected for further processing:

$$H = \begin{bmatrix} -0.3059 + 0.2314i & 0.0886 - 0.1320i & -0.8107 - 0.4160i & 0.8409 - 0.0964i \\ -1.1777 + 0.1235i & 0.2034 + 0.5132i & 0.8421 + 1.5437i & -0.0266 + 0.0806i \end{bmatrix}$$

$$n = [-0.0049 + 0.0089i \ 0.0061 - 0.0113i]^T$$

$$\|y - h_3\hat{r}_3\|^2 = \left\| \begin{matrix} [0.8058 + 0.4249i \ -0.8360 + 1.5550i]^T - \\ [0.8107 - 0.4160i \ 0.8421 + 1.5437i]^T \end{matrix} [-1] \right\|^2$$
$$= 0.0003$$

$$\|y - h_4\hat{r}_4\|^2 = \left\| \begin{matrix} [0.8058 + 0.4249i \ -0.8360 + 1.5550i]^T - \\ [0.8409 - 0.0964i \ 0.0266 + 0.0806i]^T \end{matrix} [+1] \right\|^2$$
$$= 306032$$

Based on equations (5) and (6), the transmit antenna u' which most likely transmitted the signal is the third transmit antenna and the symbol s transmitted by the third transmit antenna is $r_3'$ (i.e., [−1+0i]). Therefore, in accordance with Table 1, the input bits should be 100.

In one illustrating example MIMO system, where N=4, M=2, p=2 and with quadrature phase shift keying (QPSK) modulation scheme, input bits of a signal transmitted by a transmit antenna may consist of four bits. The first two bits are used to identify the transmit antenna and the third and the fourth bits are the data bits of the signal. For example, a signal having four input bits of 0000 indicates the signal is transmitted by the first antenna (i.e., the first two bits of 00) of the MIMO system and carries two data bits of 00 (i.e., the third and the fourth bits of 00). The data bits may be modulated in accordance with the QPSK modulation scheme of the MIMO system. Accordingly, input bits of 00, 01, 10 and 11 are modulated to symbols of [−0.7071−0.7071i], [−0.7071+0.7071i], [0.7071−0.7071i] and [0.7071−+0.7071i] on the constellation diagram of the MIMO system, respectively. Table 2 describes relations among input bits, transmit antenna index, data bits and transmitted symbol.

TABLE 2

| input bits | transmit antenna index | data bits | symbol |
|---|---|---|---|
| 0000 | 1 | 00 | [−0.7071−0.7071i] |
| 0001 | 1 | 01 | [−0.7071+0.7071i] |
| 0010 | 1 | 10 | [0.7071−0.7071i] |
| 0011 | 1 | 11 | [0.7071−+0.7071i] |
| 0100 | 2 | 00 | [−0.7071−0.7071i] |
| 0101 | 2 | 01 | [−0.7071+0.7071i] |
| 0110 | 2 | 10 | [0.7071−0.7071i] |
| 0111 | 2 | 11 | [0.7071−+0.7071i] |
| 1000 | 3 | 00 | [−0.7071−0.7071i] |
| 1001 | 3 | 01 | [−0.7071+0.7071i] |
| 1010 | 3 | 10 | [0.7071−0.7071i] |
| 1011 | 3 | 11 | [0.7071−+0.7071i] |
| 1100 | 4 | 00 | [−0.7071−0.7071i] |
| 1101 | 4 | 01 | [−0.7071+0.7071 ] |
| 1110 | 4 | 10 | [0.7071−0.7071i] |
| 1111 | 4 | 11 | [0.7071−+0.7071i] | in which the first two bits of 00, 01, 10 and 11 indicate the signals are transmitted by the first, second, third and fourth antennas of the MIMO system, respectively.

Assuming the input bits of the transmitted signal are "1101," the transmit vector x is $[0 \ 0 \ 0 \ -0.7071 \ +0.7071]^T$. With the channel matrix and noise vector below, the receive vector $y=Hx+n=[-0.5313+0.6717i -0.0321-0.0871 \ i]^T$.

Then, $r_i$, $r_i'$ and where i is from 1 to 4, are illustrated below:

$$r_1=[0.2227+0.0155i];$$

$$r_1'=[0.7071+0.7071i];$$

$$d_1=0.8444;$$

$$r_2=[-0.5665-0.0359i];$$

$$r_2'=[-0.7071-0.7071];$$

$$d_2=0.6857;$$

$$r_3=[-0.0026-0.2012i];$$

$$r_3'=[-0.7071-0.7071i];$$

$d_3=0.8673;$ $r_4=[-0.7154+0.7166i];$ $r_4'=[-0.7071+0.7071i];$ and $d_4=0.0126.$ therefore, U=[4, 2, 1, 3]. Because p=2, the fourth antenna (i.e., $u_1$) and the second antenna (i.e., $u_2$) are selected for further processing:
where $\|y-h_4\hat{r}_4\|^2=0.0003$, $\|y-h_2\hat{r}_2\|^2=0.7909$.
Based on equations (5) and (6), the transmit antenna u' which most likely transmitted the signal is the fourth transmit antenna and the symbol s transmitted by the fourth transmit antenna is $r_4'$ (i.e., [−0.7071+0.7071i]). Therefore, in accordance with Table 2, the input bits should be 1101.

Figure 2:
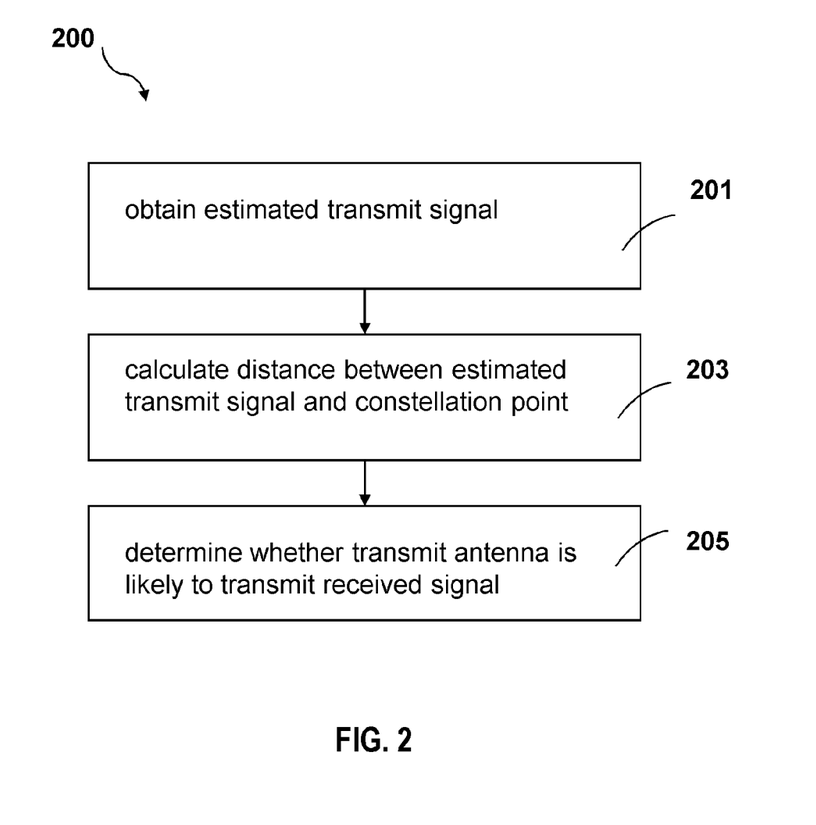
FIG. 2 is a flow chart 200 illustrating an example process of processing a signal received at a receiver of a wireless communication system in a time slot.

FIG. 2 is a flow chart 200 illustrating an example process of processing a signal received at a receiver of a wireless communication system in a time slot. The example process 200 may begin at operation 201, where an estimated transmit signal for a transmit antenna of the wireless communication system is obtained. Continuing to operation 203, a distance between the estimated transmit signal and a constellation point is calculated. The constellation point is the closest constellation point for the estimated transmit signal among all constellation points in accordance with a modulation scheme of the MIMO system. The example process 200 may continue at operation 205, where the example process 200 determines whether the transmit antenna is likely to transmit the signal received at the receiver.

In operation 201, an estimated transmit signal for a transmit antenna of the wireless communication system is obtained. In some embodiments, the estimated transmit signal is illustrated on a constellation diagram in accordance with a modulation scheme of the wireless communication system. For example, the estimated transmit signal may be one of the element of $r_i$ of the estimated transmit vector r set forth above.

In operation 203, a distance between the estimated transmit signal and a constellation point corresponding to the estimated transmit signal on the constellation diagram is calculated. The constellation point is the closest constellation point for the estimated transmit signal among all constellation points in accordance with the modulation scheme of the MIMO system. In some embodiments, the constellation point refers to $\hat{r}_i$ set forth above and the distance refers to $d_i$ set forth above.

In operation 205, the process determines whether the transmit antenna is likely to transmit the signal received at the receiver based on the distance. In some embodiments, the determination is made based on equation (4) and equation (5) set forth above.

Figure 3:
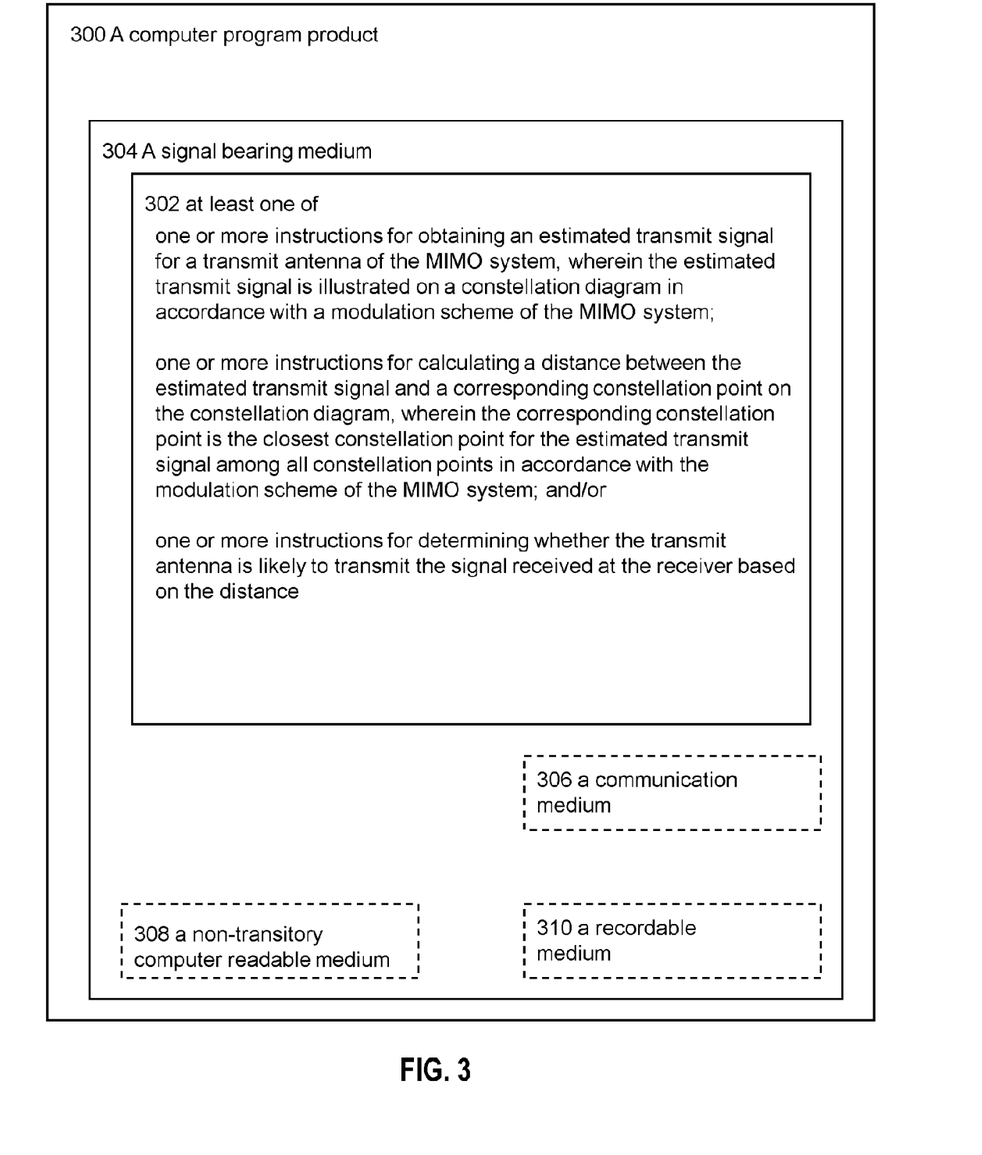
FIG. 3 is a block diagram 300 illustrating the software modules of a computer program executed by a processor for processing a signal received at a receiver of a wireless communication system.

FIG. 3 is a block diagram 300 illustrating the software modules of a computer program executed by a processor for processing a signal received at a receiver of a wireless communication system. Computer program product 300 includes one or more sets of instructions 302 for executing the methods for processing the received signal. For illustration only, the instructions 302 reflect the method described above and illustrated in FIG. 2. Computer program product 300 may be transmitted in a signal bearing medium 304 or another similar communication medium 306. Computer program product 300 may be recorded in a non-transitory computer readable medium 308 or another similar recordable medium 310.

Figure 4:
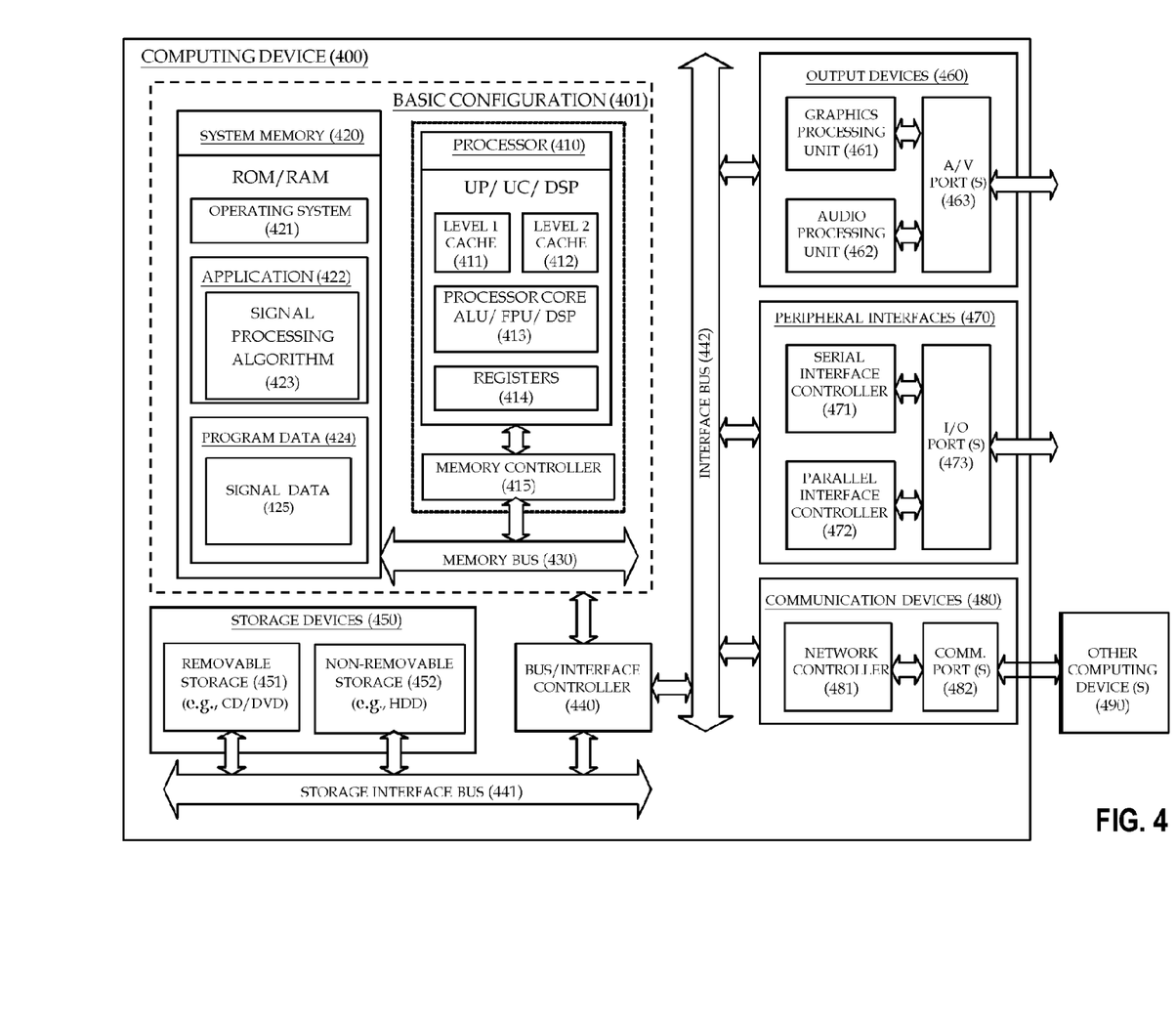
FIG. 4 is a block diagram illustrating a computing device 400 for processing a signal received at a receiver of a wireless communication system, all arranged in accordance with at least some embodiments of the present disclosure.

FIG. 4 is a block diagram illustrating a computing device 400 for processing a signal received at a receiver of a wireless communication system. In a very basic configuration 401, computing device 400 typically includes one or more processors 410 and a system memory 420. A memory bus 430 may be used for communicating between processor 410 and system memory 420.

Depending on the desired configuration, processor 410 may be of any type including but not limited to a microprocessor (μP), a microcontroller (μC), a digital signal processor (DSP), or any combination thereof. Processor 410 may include one more levels of caching, such as a level one cache 411 and a level two cache 412, a processor core 413, and registers 414. An example processor core 413 may include an arithmetic logic unit (ALU), a floating point unit (FPU), a digital signal processing core (DSP Core), or any combination thereof. An example memory controller 415 may also be used with processor 410, or in some implementations memory controller 415 may be an internal part of processor 410.

Depending on the desired configuration, system memory 420 may be of any type including but not limited to volatile memory (such as RAM), non-volatile memory (such as ROM, flash memory, etc.) or any combination thereof. System memory 420 may include an operating system 421, one or more applications 422, and program data 424. In some embodiments, application 422 may include a signal processing algorithm 423 that is arranged to perform the functions as described herein including those described with respect to the steps of the method 200 of FIG. 2. Program data 424 may include signal data 425 that may be useful for the operation of signal processing algorithm 424. In some embodiments, application 422 may be arranged to operate with program data 424 on operating system 421, such that implementations of processing signal data may be provided as described herein. This described basic configuration 401 is illustrated in FIG. 4 by those components within the inner dashed line.

Computing device 400 may have additional features or functionality, and additional interfaces to facilitate communications between basic configuration 401 and any required devices and interfaces. For example, a bus/interface controller 440 may be used to facilitate communications between basic configuration 401 and one or more data storage devices 450 via a storage interface bus 441. Data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage devices 451 and non-removable storage devices 452 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 442 for facilitating communication from various interface devices (e.g., output devices 460, peripheral interfaces 470, and communication devices 480) to basic configuration 401 via bus/interface controller 440. Example output devices 460 include a graphics processing unit 461 and an audio processing unit 462, which may be configured to communicate to various external devices such as a display or speakers via one or more A/V ports 463. Example peripheral interfaces 470 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which may be arranged to facilitate communications with one or more other computing devices 490 over a network communication link via one or more communication ports 482. In some embodiments, the other computing devices 490 may include other applications, which may be operated based on the results of the application 422.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for processing a signal received at a receiver in a multiple-input multiple-output (MIMO) system in a time slot, comprising:
   obtaining an estimated transmit signal for a transmit antenna of the MIMO system based on the signal received at the receiver and a channel matrix of the MIMO system, wherein the estimated transmit signal is illustrated on a constellation diagram in accordance with a modulation scheme of the MIMO system;
   calculating a distance between the estimated transmit signal and a corresponding constellation point on the constellation diagram, wherein the corresponding constellation point is the closest constellation point for the estimated transmit signal among all constellation points in accordance with the modulation scheme of the MIMO system; and
   determining whether the transmit antenna is likely to transmit the signal received at the receiver based on the distance.

2. The method of claim 1, further comprising obtaining a plurality of other estimated transmit signals for other transmit antennas of the MIMO system.

3. The method of claim 1, further comprising retrieving data bit included in the signal received at the receiver.

4. The method of claim 1, wherein the determining is further based on a product of a column of the channel matrix of the MIMO system and the corresponding constellation point.

5. The method of claim 2, further comprising calculating an other distance between any of the plurality of other estimated transmit signals and its corresponding constellation point.

6. The method of claim 4, wherein the determining is further based on a difference between the signal received at the receiver and the product.

7. The method of claim 5, further comprising generating an antenna index based on calculated distances including the distance and the other distances, wherein the antenna index corresponds to a sequence of the calculated distances organized in an increasing order in magnitude.

8. The method of claim 7, further comprising selecting one or more elements from the antenna index, wherein one of the selected elements corresponds to one of the calculated distances having a minimum magnitude.

9. The method of claim 8, wherein the number of selected elements is configurable based on a computation resource of the MIMO system.

10. A non-transitory computer-readable storage medium encoded with computer-executable instructions for processing a signal received at a receiver in a MIMO system in a time slot, which when executed by a computing device, causes the computing device to:
    obtain an estimated transmit signal for a transmit antenna of the MIMO system based on the signal received at the receiver and a channel matrix of the MIMO system, wherein the estimated transmit signal is illustrated on a constellation diagram in accordance with a modulation scheme of the MIMO system;

calculate a distance between the estimated transmit signal and a corresponding constellation point on the constellation diagram, wherein the corresponding constellation point is the closest constellation point for the estimated transmit signal among all constellation points in accordance with the modulation scheme of the MIMO system; and determine whether the transmit antenna is likely to transmit the signal received at the receiver based on the distance.

11. The non-transitory computer-readable storage medium of claim 10, further containing additional instructions, which when executed by the computing device, causes the computing device to obtain a plurality of other estimated transmit signals for other transmit antennas of the MIMO system.

12. The non-transitory computer-readable storage medium of claim 10, further containing additional instructions, which when executed by the computing device, causes the computing device to retrieve data bit included in the signal received at the receiver.

13. The non-transitory computer-readable storage medium of claim 11, further containing additional instructions, which when executed by the computing device, causes the computing device to calculate an other distance between any of the plurality of other estimated transmit signals and its corresponding constellation point.

14. The non-transitory computer-readable storage medium of claim 13, further containing additional instructions, which when executed by the computing device, causes the computing device to generate an antenna index based on calculated distances including the distance and the other distances, wherein the antenna index corresponds to a sequence of the calculated distances organized in an increasing order in magnitude.

15. The non-transitory computer-readable storage medium of claim 14, further containing additional instructions, which when executed by the computing device, causes the computing device to select one or more elements from the antenna index, wherein one of the selected elements corresponds to one of the calculated distances having a minimum magnitude.

16. A computing device configured to process a signal received at a receiver in a MIMO system in a time slot, comprising:

a processing unit, wherein the processing unit is configured to obtain an estimated transmit signal for a transmit antenna of the MIMO system based on the signal received at the receiver and a channel matrix of the MIMO system, wherein the estimated transmit signal is illustrated on a constellation diagram in accordance with a modulation scheme of the MIMO system;

calculate a distance between the estimated transmit signal and a corresponding constellation point on the constellation diagram, wherein the corresponding constellation point is the closest constellation point for the estimated transmit signal among all constellation points in accordance with the modulation scheme of the MIMO system; and determine whether the transmit antenna is likely to transmit the signal received at the receiver based on the distance.

17. The computing device of claim 16, wherein the processing unit is further configured to obtain a plurality of other estimated transmit signals for other transmit antennas of the MIMO system.

18. The computing device of claim 17, wherein the processing unit is further configured to calculate an other distance between any of the plurality of other estimated transmit signals and its corresponding constellation point.

19. The computing device of claim 18, wherein the processing unit is further configured to generate an antenna index based on calculated distances including the distance and the other distances, wherein the antenna index corresponds to a sequence of the calculated distances organized in an increasing order in magnitude.

20. The computing device of claim 19, wherein the processing unit is further configured to select one or more elements from the antenna index, wherein one of the selected elements corresponds one of the calculated distances having a minimum magnitude.

* * * * *

UNITED STATES PATENT AND TRADEMARK OFFICE
CERTIFICATE OF CORRECTION

PATENT NO. : 8,755,465 B2
APPLICATION NO. : 13/990429
DATED : June 17, 2014
INVENTOR(S) : Xiao et al.

It is certified that error appears in the above-identified patent and that said Letters Patent is hereby corrected as shown below:

IN THE SPECIFICATION:

In Column 3, Line 54, delete "point r,'" and insert -- point $r_i'$ --, therefor.

In Column 5, Line 3, delete "where" and insert -- $d_i'$ where --, therefor.

In Column 5, Line 57, delete "306032" and insert -- 3.6032 --, therefor.

In Column 6, in Table 2, under "symbol", Line 14, delete "+0.7071]" and insert -- +0.7071i] --, therefor.

In Column 6, Line 40, delete "+0.7071]$^T$." and insert -- +0.7071i]$^T$. --, therefor.

Signed and Sealed this
Thirtieth Day of December, 2014

Michelle K. Lee
*Deputy Director of the United States Patent and Trademark Office*